United States Patent [19]

Guerriero et al.

[11] Patent Number: 5,093,090
[45] Date of Patent: Mar. 3, 1992

[54] PROCESS FOR SEPARATING ANTIMONY FROM ACIDIC SOLUTIONS CONTAINING SAME WITH AN ORGANIC DILUENT CONTAINING A POLYOL

[75] Inventors: Renato Guerriero; Italo Vittadini, both of Venice, Italy

[73] Assignee: Nuova Samim S.p.A., Milan, Italy

[21] Appl. No.: 466,319

[22] PCT Filed: Nov. 25, 1988

[86] PCT No.: PCT/EP88/01084
§ 371 Date: May 4, 1990
§ 102(e) Date: May 4, 1990

[87] PCT Pub. No.: WO89/05279
PCT Pub. Date: Jun. 15, 1989

[30] Foreign Application Priority Data

Dec. 11, 1987 [IT] Italy ................. 22947 A/87

[51] Int. Cl.$^5$ ............................. C01G 30/00
[52] U.S. Cl. ........................ 423/87; 75/722; 75/710
[58] Field of Search .............. 423/87; 75/703, 722, 75/724, 710; 210/688

[56] References Cited

U.S. PATENT DOCUMENTS 4,102,976  7/1978  Hiemeleers et al. ........... 75/722

FOREIGN PATENT DOCUMENTS 0597239  12/1982  U.S.S.R. ........................ 423/87

OTHER PUBLICATIONS

Journal of Inorganic and Nuclear Chemistry, vol. 36, (1974).
Chemical Abstracts, vol. 107, No. 22 (Nov. 30, 1987).

Primary Examiner—Theodore Morris
Assistant Examiner—Edward Squillante
Attorney, Agent, or Firm—Shea & Gould

[57] ABSTRACT

There is disclosed a method for the separation of antimony from acidic solutions which contain antimony, alone, or together with other metallic ions, by extracting antimony with an organic, water-immiscible, polyol-containing diluent. The method comprises the steps of contacting the antimony-containing acidic solution with a water-immiscible organic diluent containing at least one polyol dissolved therein, preferably a diol, said polyol serving to extract the antimony. The polyol serves to selectively extract the antimony from the acidic solution to the exclusion of other metallic ions such as copper and nickel.

18 Claims, No Drawings

PROCESS FOR SEPARATING ANTIMONY FROM ACIDIC SOLUTIONS CONTAINING SAME WITH AN ORGANIC DILUENT CONTAINING A POLYOL

This invention relates to a process for separating antimony from acidic solutions which contain antimony and possibly other metals.

More particularly, this invention relates to a process for the separation of antimony from sulphuric solutions.

Still more particularly, this invention relates to a process for separating pentavalent antimony from acidic solutions, more particularly, sulphuric solutions, which contain metal ions other than antimony ions.

A number of metallurgincal processes are known, which are capable of controlling the concentrations of antimony in the solutions in which it is undesirably present, such as in the solutions discharged from the copper electrorefining cells.

In the majority of the instances, these are, regrettably, processes which provide for the use of toxic substances, such as tributylphosphate (TBP).

It is interesting, moreover, to have a simple procedure available for striping antimony from strongly acidic solutions.

It has been surprisingly ascertained that it is possible to simply, economically and efficiently separate antimony from acidic solutions which contain it, possibly together with other metallic ions, and without using any toxic substances, by merely extracting antimony with an organic, water-immiscible, polyol-containing diluent.

The process according to the present invention comprises the steps of contacting, either counter-currently or co-currently, the antimony-ion-containing acidic solution with a water-immiscible organic diluent, which essentially consists of hydrocarbons, alcohols and their mixtures and containing at least one polyol dissolved therein, preferably and particularly a diol, said polyol extracting the antimony, the latter being then re-extracted by a counter-solvent. Among the polyols which can be used in the process of this invention, diols can be mentioned, which have a number of carbon atoms equal to, or higher than 7, the triols having a number of carbon atoms equal to, or higher than, 10.

Particular exemplary diols are octane-1,2-diol, decane-1,2-diol, dodecane-1,2-diol, tetradecane-1,2-diol (TDD), and hexadecane-1,2-diol.

Further examples are phenylethane-1,2-diol, 2-phenyl-propane-1,2-diol, 2-ethylhexane-1,3-diol, 2-methyl-propylpropane-1,3-diol, 2,2-dimethylhexane-3,5-diol, octane-1,8-diol, dodecane-1,12-diol, and 4-octylcyclohexane-1,2-diol.

The concentration of the polyols in the diluent is comprised between 1% and 25%, preferably between 5% and 15%.

As diluents, there can be used, alone or in admixture, aliphatic, aromatic and naphthenic hydrocarbon compounds, monohydric alcohols and ethereal compounds.

It is essential that the diluents are good solvents for the polyols and virtually insoluble in the aqueous phase.

The ratio of the organic phase (diluent+solute) to the aqueous phase may be varied between 0.1 and 10, preferably between 1 and 5.

Re-extraction of antimony from the organic phase can be carried out conveniently by using a counter-solvent consisting of alkaline, neutral, acidic solutions, or acidic saline solutions.

A neutral, or an alkaline aqueous solution is preferably employed.

The ensuing Examples are merely illustrative of the invention.

EXAMPLE 1

In a 200-ml separatory funnel there are mixed with vigorous stirring 20 ml of an aqueous solution, containing 168 g/l of $H_2SO_4$ and 0,41 g/l of Sb, with 100 ml of a 10% weight/volume solution of tetradecane-1,2-diol (TDD) in undecanol (LIAL 111).

After 10 min, the mixture is allowed to settle and antimony is analyzed in the aqueous phase, and is found to be 0.36 g/l (14% extraction).

EXAMPLE 2

The procedure is that of Example 1, with the exception of the quantity of $H_2SO_4$, which is raised to 177 g/l.

Upon settling, Sb in the aqueous phase is 0,32 g/l (21% extraction).

EXAMPLE 3

The procedure is as in Example 1, with the exception of the quantity of $H_2SO_4$, which is raised to 187 g/l.

Upon settling, Sb in the aqueous phase is 0.30 g/l (25% extraction).

EXAMPLE 4

The procedure is that of Example 1, with the exception of the quantity of $H_2SO_4$, which is raised to 231 g/l.

Upon settling, Sb in the aqueous phase is 0.27 g/l (34% extraction).

EXAMPLE 5

The procedure is the same as in Example 1, but the concentration of $H_2SO_4$ is 160 g/l and the Cu concentration is 58 g/l, the Sb concentration being still 0.41 g/l.

Upon settling, Sb in the aqueous phase is 0.36 g/l (14% extraction).

Cu is not extracted.

EXAMPLE 6

The procedure is that of Example 1, but the concentration of $H_2SO_4$ is 250 g/l and that of Cu is 2 g/l, the Sb concentration being 0.41 g/l once again.

Upon settling, Sb in the aqueous phase is 0.25 g/l (39% extraction).

Cu is not extracted.

EXAMPLE 7

A solution is prepared, which contains: Sb: 0.41 g/l; $H_2SO_4$: 168 g/l; Cu: 58 g/l, and Ni: 10 g/l.

The procedure is that of Example 1, but the vigorous stirring last 20 min.

Upon settling, Sb measure n the aqueous solution is 0,36 g/l (14% extraction).

Cu and Ni are not extracted.

EXAMPLE 8

The procedure is as in Example 7, but with the following changes: $H_2SO_4$: 235 g/l, and Cu: 2 g/l.

Upon settling, Sb analyzed in the aqueous solution is 0,25 g/l (39% extraction).

Cu and Ni are not extracted.

EXAMPLE 9

In a 200 ml separatory funnel, there are mixed with vigorous stirring, 100 ml of an aqueous solution containing 168 g/l of sulphuric acid and 0.41 g:l of antimony, with 20 ml of a 10% weight/volume solution of tetradecane-1,2-diol (TDD) in undecanol (LIAL 111).

After 10-min stirring, the mixture is allowed to settle and the organic phase is separated.

The operation is repeated 4 times, each time with 20 ml of fresh organic phase.

On completion, the aqueous phase is analyzed for antimony, the latter being found 0.25 g/l (39% extraction).

EXAMPLE 10

The procedure is that of Example 9, but the sulphuric acid concentration is 231 g/l.

The aqueous phase is analyzed for antimony, and the latter is 0,21 g/l (51% extraction).

We claim:

1. Process for the separation of antimony from acidic aqueous solutions containing antimony, alone or together with other metals, characterized in that the acidic aqueous solution is contacted with a water-immiscible organic diluent, consisting of hydrocarbons, alcohols and their mixtures, and containing dissolved therein at least one polyol, said polyol extracting the antimony, which is subsequently re-extracted with a counter-solvent.

2. Process according to claim 1, characterized in that the polyol is a diol.

3. Process according to claim 1, characterized in that the polyol, if a diol, has a number of carbon atoms equal to, or higher than 7, and, if a triol, it has a number of carbon atoms equal to, or higher than 10.

4. Process according to claim 1, characterized in that the polyols are selected from among: octane-1,2-diol, decane-1,2-diol, dodecane-1,2-diol, tetradecane-1,2-diol, hexadecane-1,2-diol, phenylethane-1,2-diol, 2-phenylpropane-1,2-diol, 2-ethylhexane-1,3-diol, 2-methylpropylpropane-1,3-diol, 2,2-dimethylhexane-3,5-diol, octane-1,8-diol, dodecane1,12-diol, and 4-octylcyclohexane-1,2-diol.

5. Process according to claim 1, characterized in that the concentration of the polyol in its diluent is comprised between 1% and 25%.

6. Process according to claim 5, characterized in that said concentration is comprised between 5% and 15%.

7. Process according to claim 1, characterized in that the diluent is selected from among aliphatic, aromatic and naphthenic hydrocarbon compounds, monohydric alcohols and ethereal compounds, individually, or in admixture.

8. Process according to claim 1, characterized in that the ratio of the organic phase (diluent+solute) to the aqueous phase is comprised between 0.1 and 10.

9. Process according to claim 8, characterized in that said ratio is comprised between 1 and 5.

10. Process according to claim 1, characterized in that the counter-solvent is selected from among alkaline, neutral solutions, water and acidic solutions.

11. Process according to claim 2, characterized in that the diol has a number of carbon atoms equal to, or higher than 7.

12. A process for the separation of antimony from acidic aqueous solutions containing antimony, alone, or together with other metals, said process comprising:
   (a) contacting the antimony-containing solution with a water-immiscible organic diluent containing an extractant comprised of at least one polyol.

13. A process according to claim 12, wherein the polyol is selected from the group consisting of diols having at least 7 carbon atoms and triols having at least 10 carbon atoms.

14. A process according to claim 12, wherein the polyol is a diol.

15. A process according to claim 14, wherein the diol is tetradecane-1,2-diol.

16. A process according to claim 15, wherein the acidic aqueous solution is comprised of sulfuric acid.

17. A process according to claim 16, wherein the sulfuric acid is present in solution in an amount of from about 160 grams per liter to about 250 grams per liter.

18. In a process for the separation of antimony from an acidic solution containing antimony, alone, or in combination with other metals, the improvement comprising using as an extractant a polyol.

* * * * *